United States Patent [19]

Back

[11] Patent Number: 4,704,244

[45] Date of Patent: Nov. 3, 1987

[54] METHOD FOR EXTRUSION PRODUCTION OF LARGE DIMENSIONAL THERMOPLASTIC ARTICLES

[75] Inventor: John T. Back, Vasa, Finland

[73] Assignee: Oy Wilk & Hoglund AB, Vasa, Finland

[21] Appl. No.: 670,012

[22] Filed: Nov. 9, 1984

[30] Foreign Application Priority Data

Feb. 27, 1984 [CA] Canada .................................. 448360

[51] Int. Cl.⁴ ............................................. B29C 47/90
[52] U.S. Cl. ................................ 264/566; 156/244.14; 156/244.21; 264/171; 264/173; 264/177.19; 264/209.4; 264/210.2; 264/237; 425/131.1; 425/325; 425/326.1
[58] Field of Search ................ 264/171, 173, 565–566, 264/209.4, 568, 237, 210.2, 560, 177.19; 425/131.1, 133.1, 326.1, 325; 156/244.14, 244.19, 244.21

[56] References Cited

U.S. PATENT DOCUMENTS

| | | | |
|---|---|---|---|
| 3,189,941 | 6/1965 | Reifenhauser | 425/133.1 |
| 3,477,099 | 11/1969 | Lee et al. | 425/133.5 |
| 3,552,259 | 1/1971 | Griffith | 425/133.1 |
| 3,825,641 | 7/1974 | Barnett | 264/568 |

FOREIGN PATENT DOCUMENTS 3044535 6/1982 Fed. Rep. of Germany .

Primary Examiner—Jeffery Thurlow
Attorney, Agent, or Firm—Zarley, McKee, Thomte, Voorhees & Sease

[57] ABSTRACT

Thermoplastic articles such as fenders, of large cross-sectional dimensions, may be made by extrusion without shrinkage voids by extruding a first stream of thermoplastic as a hollow profile, and extruding a second stream of molten thermoplastic by a second extruder and forcing same under pressure into the hollow profile to fill the voids of shrinkage on cooling.

7 Claims, 3 Drawing Figures

METHOD FOR EXTRUSION PRODUCTION OF LARGE DIMENSIONAL THERMOPLASTIC ARTICLES

This application relates to an improved process whereby solid plastic articles such as polyethylene bumpers or fenders and the like of large cross-sectional dimensions may be formed by a more or less continuous extrusion process rather than individual or batch molding. Furthermore, the method allows for the extrusion forming of articles of large cross-sectional dimensions without structural defects and internal voids due to shrinkage on cooling, common in non-foamed thermoplastics.

Although the development of plastics has chiefly centred around the manufacture of small articles, it has come to be realized that large dimensional elastomeric and thermoplastic materials may serve well as replacements for traditional materials such as metal, wood or rubber.

One example is the increasing use of flexible polyethylene fenders, in place of wooden timbers, in harbour facilities such as wharfs, piers, pontoons, and the sides of ships to resist the abrasion of contact between docks and ships and other installations which move in response to tide and wave movement.

Whereas timbers tend to rot or splinter and require frequent replacement and repair, it has been found that fenders of flexible polyethylene bolted to the harbour facilities are far better. They exhibit high impact strength, low friction coefficient to the relative movement of a ship or the like, abrasion resistance, flexibility, high chemical and climatic resistance, poor adhesion to ice. In addition, the material is homogenous and relatively easy to work with and requires relatively low maintenance cost.

Hitherto the manufacture of thermoplastic articles of large cross-sectional dimensions such as solid polyethylene sliding fenders has been done by placing molten polyethylene in a mold of the appropriate dimensions and allowing it to cool and harden. This method is slow and somewhat labour intensive because the articles must be made individually in a series of molds, allowed time to cool, and removed individually. Furthermore, the articles are of fixed and limited length as determined by the size of the mold.

It has previously been considered that extrusion techniques were not suitable to the production of large dimensional articles such as sliding fenders because shrinkage of the molten polyethylene in the interior of the article (after the exterior portion had cooled and solidified) tended to cause voids resulting in structural weakness and lack of homogeneity.

It is the purpose of the present invention to provide a method for manufacturing such large dimensional articles as sliding polyethylene sliding fenders and the like by a continuous extrusion method. It is therefore the further purpose of this invention to provide faster production rates with less man power and to produce articles of any desirable length.

It is also the purpose of this invention to provide a method of producing large dimensional articles by the advantageous method of continuous extrusion without incurring the disadvantages of internal voids or dimensional discrepancies.

These objects and other advantages are sought to be achieved by the present invention in which non-foamed thermoplastic articles of large cross-sectional dimension are provided for use in such articles as fenders, by a method which comprises the steps of extruding a first stream of molten thermoplastic material through a die to form a hollow profile which is cooled in a calibration jacket and feeding a second stream of molten thermoplastic material into the hollow under pressure at a point near the downstream end of the calibration jacket, so as to fill any voids due to shrinkage on cooling. Excess molten material may be injected under pressure by ballooning the hollow profile where it leaves the calibration jacket. The second stream of molten plastic is provided by a second extrusion screw operated independently of the first.

The nature of the present invention may be better understood by the following description of one embodiment thereof with reference to the attached drawings in which.

Figure 1:
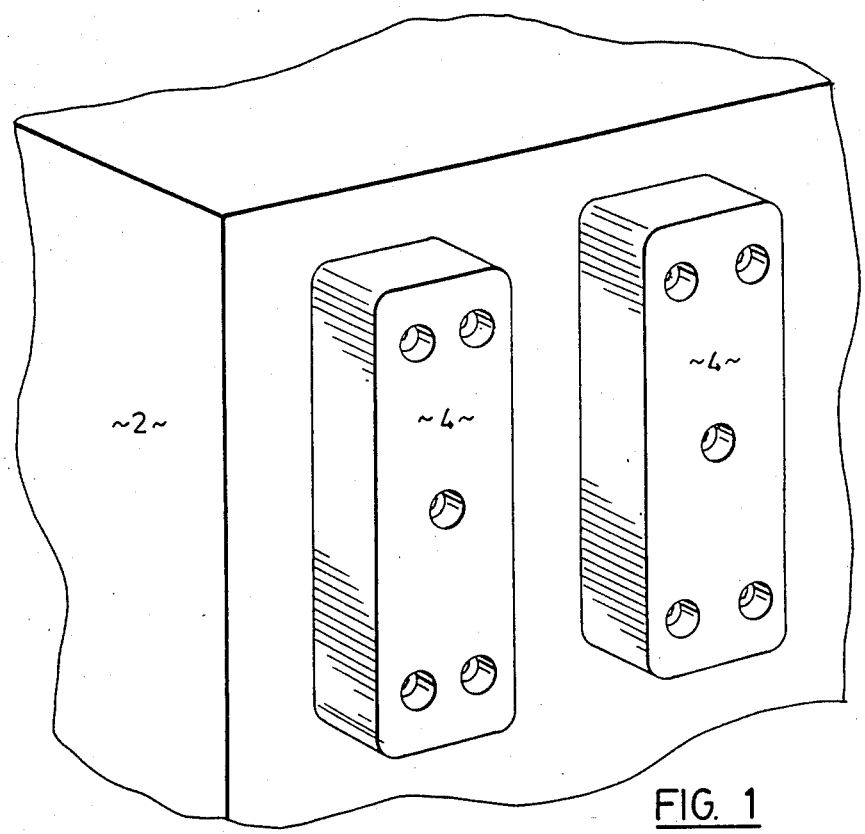
FIG. 1 illustrates an installation of flexible polyethylene sliding fenders on the side of a wharf or similar structure.

In FIG. 1 a typical concrete wharf 2 has mounted on the sides thereof a series of fenders 4 which are designed to handle the sliding contact between the wharf and ships or other vessels which move according to the tides or waves. Flexible polyethylene fenders are appropriate for this purpose because, although they are not intended primarily to act as bumpers, they can absorb a considerable amount of impact, but more importantly they provide a relatively low friction contact between moving bodies, unlike rubber. And unlike wood they are less subject to rot, splintering or structural defects.

Figure 2:
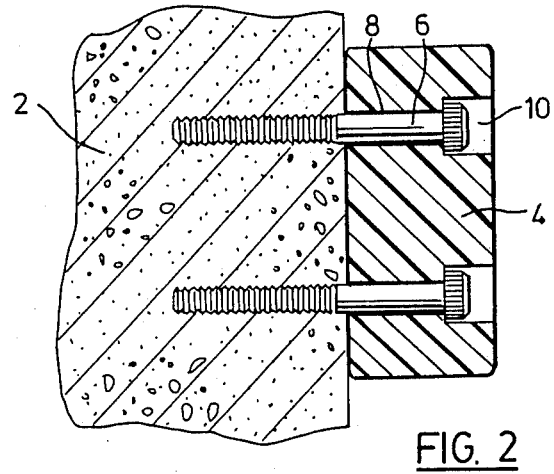
FIG. 2 illustrates a cross-sectional view of a sliding fender bolted to the concrete wharf such as illustrated in FIG. 1.

In FIG. 2 it can be seen how the fenders 4 are mounted to the pier 2 by bolts 6 passing through the body of the fender and anchored in the concrete of the wharf. Polyethylene can be easily worked by drills and other similar tools and can therefore be provided with holes 8 designed to accommodate the bolt and ideally an enlarged bore 10 allows the bolts to be counter sunk so that they are not exposed to contact with the moving body such as a ship or other vessel. Such fenders are typically about 100 to 300 millimeters in width (parallel to the side of the wharf) and approximately 50 to 200 millimeters in thickness (perpendicular to the wharf).

Because harbour installations vary greatly in their design and needs, it is highly desirable that such fenders be available in a wide variety of length. For this reason as well as for efficiencies and economy in manufacturing, it is desirable to produce such fenders in continuous length by extrusion.

Figure 3:
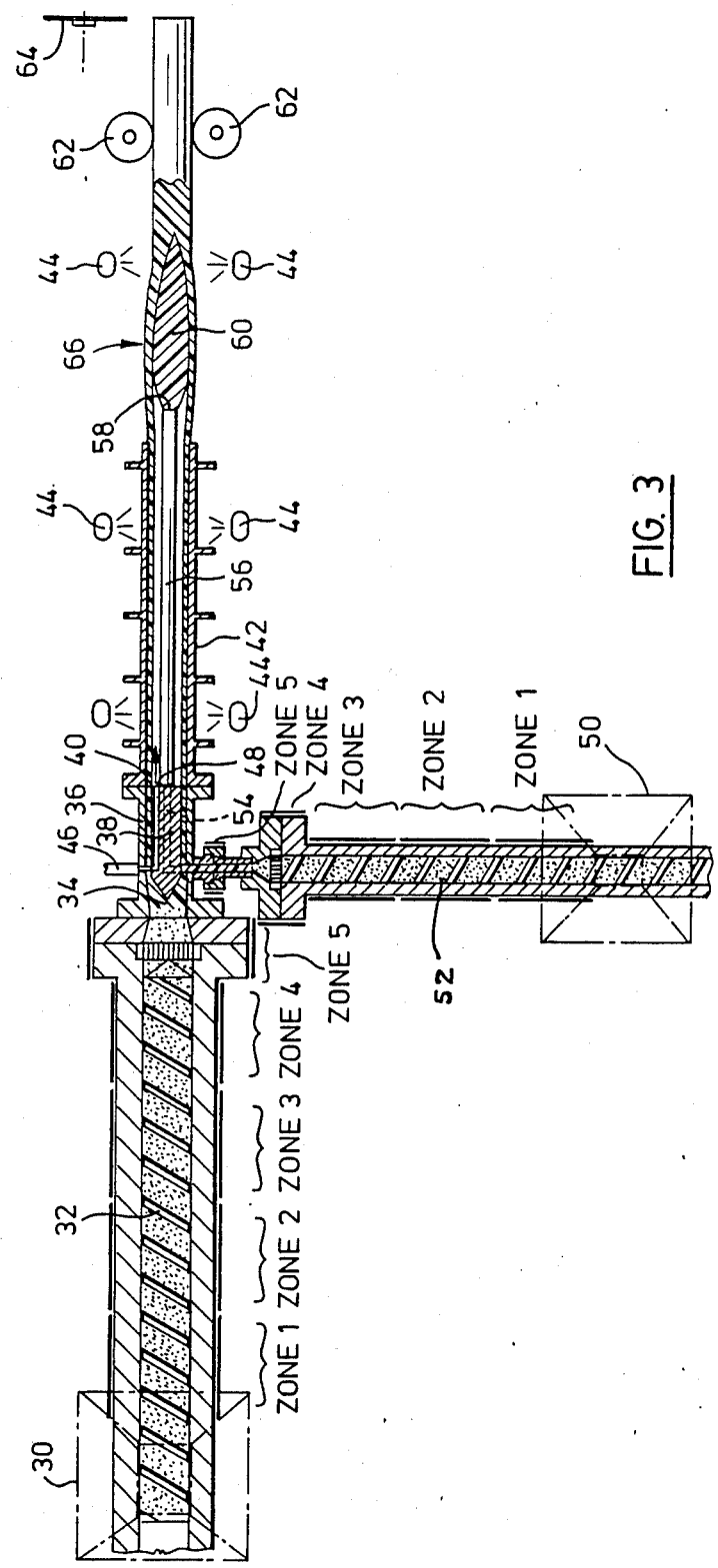
FIG. 3 illustrates in cross section the apparatus and method by which such articles may be manufactured by continuous extrusion.

FIG. 3 illustrates diagramatically the method of the present invention by which such bulky articles of large cross-sectional area may be manufactured without defects in dimensions or internal structure.

In the illustrated embodiment of FIG. 3, the apparatus comprises a first hopper 30 wherein the raw material of the finished product, such as medium density polyethylene, is introduced, preferably in pellet or similar small particle size, and descends into a feed screw 32 where it is plasticated and driven forward through zones 1, 2, 3, 4 and 5 in a conventional extrusion technique. During this process the temperature of the plastic will be elevated from approximately at zone 120° C. at zone 1 to approximately 150° C. at zone 5. At 34 the molten plastic enters the die formed by the outer shell 36 and the inner core 38 thereby producing a hollow profile, which in the case of a sliding fender would ideally be rectangular, which emerges at the outlet of the die at 40.

This hollow profile then proceeds along the length of the cooling jacket 42 which is shaped to the desired final configuration of the end product and is cooled by spraying or circulating water shown schematically at 44. The cooling jacket 42 serves to cool the melted polyethylene to a solid or semisolid state and forms it in the desired external shape.

To aid in this process a pipe 46 conducts pressurized air from a suitable source at a pressure at approximately 16 Kilopascals to an outlet in the face of the die core 48 which opens into the interior of the hollow plastic profile. Thus, by air pressure the hollow profile is held against the sides of the cooling jacket 42 to ensure that the plastic is maintained in close contact with the cooling surface of the jacket and that it is held in the desired shape dictated by the configuration of the jacket.

Meanwhile a second source of the same raw material (such as non-foamed polyethylene) is introduced through the hopper 50 and fed by a second feed screw 52 through zones 1, 2, 3, 4 and 5. As with the main extruder this causes the plastic to become plasticated and molten and increases the temperature from about 120° C. to approximately 150° C. at zone 5.

The second stream of molten plastic is driven from zone 5 through an internal conduit 54 in the centre of the extrusion die core 38 and passes at the face of the die into a central pipe 56 which runs axially down the centre of the cooling jacket inside the hollow plastic profile and terminates at 58 near the end of the cooling jacket where the profile material emerges.

Thus, a second stream of thermoplastic material is forced under pressure down the length of the hollow profile, but without being exposed to the same cooling effect of the jacket 42 and is forced, under pressure, into the interior of the hollow profile at 58. At this point it is exposed to the cooler external profile and itself begins to solidify. However, because cooling takes place slower at the centre a wedge or cone of cooling thermoplastic appears as illustrated at 60, which wedge or cone moves relatively rearward as the extruded material is moved forward by the take-off rolls illustrated at 62. As illustrated, by the time the material reaches the rolls 62, the entire cross-section has solidified. At 64 is illustrated a saw by which the continuous extrusion can be cut into standard lengths or whatever lengths are specifically required for any particular application.

Because it is one purpose of the present invention to overcome the voids and dimensional deficiencies due to shrinkage on cooling, the second extruder 52 provides molten plastic to the inner space of the profile at 58 under elevated pressure to ensure that any voids which tend to develop because of shrinkage will be filled by the addition of more molten material.

Furthermore, because the molten material is injected approximately where the profile leaves the cooling and shaping jacket 42, the outer hollow profile, which has solidified but remains somewhat flexible, will be caused to expand or balloon at the area 66 thus accommodating somewhat more material in terms of volume than would otherwise be possible or desirable. This ballooning effect accommodates the tendency of the thermoplastic material to contract or shrink on cooling and allows this to happen without creating void spaces while at the same time allowing the profile to return to its desired and nominal shape and dimension as defined by the jacket 42. By controlling the temperature and the rate of the feed screw 52, the desired amount of material and the desired pressure in zone 66 can be achieved so that the appropriate shape is produced without shrinkage, voids or defective dimensions.

By employing a second extruder it is possible to ensure the injection of a sufficiently molten and fluid material into the zone where cooling and shrinkage is taking place and this secondary flow may be controlled independently at the rate of production from the main extruder. In addition, the air pressure injected through the conduit 46 will provide further assistance to urge the molten material into the zone of solidification at 60.

While the foregoing preferred embodiment contemplates a uniform section formed by the same material introduced into both streams, it is entire possible that two different materials could be employed so as to provide a product which, for example, has a rigid central core with a soft outer shell, or alternatively, a tough abrasion resistant outer shell with a soft resilient inner core.

The following description may be better exemplified by the following data from experimental production:

EXAMPLE I

Product - Sliding Fender
Rectangular Cross Section - 300 mm × 200 mm

| Raw Material: | Low Density non-foamed Polyethylene | | | |
|---|---|---|---|---|
| Main Extruder: | Bandera 120 mm diameter, Type - 24D | | | |
| Temperature Chart: | Cylinder | Temp. | Head | Temp |
| | Zone 1 | 120° C. | Zone 5 | 150° C. |
| | Zone 2 | 140° C. | Die | 150° C. |
| | Zone 3 | 140° C. | | |
| | Zone 4 | 150° C. | | |
| Air Pressure: | 20 KPA (Kilopascals) | | | |
| Gear: | Gear II | | | |
| Co-extruder: | Bandera 80 mm diameter, Type - 20D | | | |
| Temperature Chart: | Cylinder | Temp. | Head | Temp. |
| | Zone 1 | 120° C. | Zone 4 | 150° C. |
| | Zone 2 | 130° C. | Zone 5 | 150° C. |
| | Zone 3 | 150° C. | | |
| Gear: | Gear VI | | | |
| Output: | 2.70 meters per hr., or 153 kg. per hr. | | | |

EXAMPLE II

Product - Sliding Fender
Rectangular Cross Section - 190 mm × 110 mm

| Raw Material: | Low Density non-foamed Polyethylene | | | |
|---|---|---|---|---|
| Main Extruder: | Bandera 120 mm diameter, Type - 24D | | | |
| Temperature Chart: | Cylinder | Temp. | Head | Temp |
| | Zone 1 | 120° C. | Zone 5 | 150° C. |
| | Zone 2 | 135° C. | Die | 150° C. |
| | Zone 3 | 140° C. | | |
| | Zone 4 | 150° C. | | |
| Air Pressure: | 16 KPA (Kilopascals) | | | |
| Gear: | Gera II | | | |
| Co-extruder: | Bandera 80 mm diameter, Type - 20D | | | |
| Temperature Chart: | Cylinder | Temp. | Head | Temp. |
| | Zone 1 | 120° C. | Zone 4 | 150° C. |
| | Zone 2 | 130° C. | Zone 5 | 150° C. |
| | Zone 3 | 150° C. | | |
| Gear: | Gear V | | | |
| Output: | 4.92 meters per hr., or 97 kg. per hr. | | | |

Thus the foregoing apparatus and method provide means whereby large or bulky articles of large cross-sectional area such as sliding fenders can be manufactured by a means which is faster, more continuous, requiring less man power, can be continuously adjusted and regulated and which overcomes the problems of shrinkage voids and dimensional discrepancies which had previously discouraged the use of extrusion techniques for such articles.

While requirements vary with other parimeters, experience shows that a ballooning which increases the volume by about 8% is effective and workable.

While we have here described the technique with reference to the manufacture of sliding fenders which present a good example of useful application of the present invention, it is contemplated that the technique may be applied to other articles of different shape or utility.

This invention is directed to the fabrication of articles of solid, non-foamed thermoplastics because it is desirable to avoid the defects of shrinkage voids common in such articles. The problem is not faced in foamed thermoplastics because the foaming agent expands to occupy any "void" due to shrinkage and foamed plastics are, by definition, filled with voids in any event.

While the technique herein described represents a preferred embodiment, it will be further realized that various modifications and variations in the apparatus or method may be employed by those skilled in the art or otherwise without departing from the inventive concept herein.

What I claim as new and desire to protect by Letters Patent of the United States is an follows:

1. A method of making a homogeneous non-foamed thermoplastic article of large cross-sectional dimensions comprising the steps of:
   extruding a first stream of molten thermoplastic material through a die to form a hollow profile;
   passing said hollow profile through a calibration jacket to shape and cool same sufficiently to solidify the thermoplastic material;
   feeding a second stream of molten thermoplastic material through a conduit extending along the hollow of said first stream profile and injecting said second stream into said hollow at a point substantially downstream from said die, approximately at the downstream end of said calibration jacket, while exerting sufficient pressure on said second stream to force said thermoplastic material of said second stream into any void spaces in said hollow profile, and further to cause said hollow profile to expand larger than the calibration dimension upon emerging from the downstream end of said calibration jacket, whereby to allow extra material to be injected in said hollow profile to accommodate the volume of shrinkage on cooling, and allowing said hollow profile to return to the calibration dimension when said second stream shrinks upon cooling.

2. A method as claimed in claim 1 in which said second stream is carried by a conduit to a point downstream of said die where said first material is cooled to a point where it is no longer molten.

3. A method as claimed in claim 2 in which said second stream is deposited in said hollow profile downstream of the calibrating jacket and adjacent to the cone of solidification.

4. A method as claimed in claim 3 in which said first stream is fed by a first extrusion screw and said second stream is fed by a second extrusion screw, the temperatures and rate of said extrusion screws being respectively independently controlled.

5. A method as claimed in claim 4 in which said second stream is conducted by a conduit extending through the core of said die and continuing to a point downstream of said calibration jacket.

6. A method as claimed in claim 5 in which the pressure of said second stream is sufficient to balloon the hollow profile downstream from the calibration jacket by approximately 8% greater than its nominal dimensions.

7. A method as claimed in claim 1 in which said second stream is carried by a conduit to a point downstream of said die where said first material is cooled to a point where it is no longer molten.

* * * * *